(12) United States Patent
Mohler (10) Patent No.: US 6,756,873 B2
(45) Date of Patent: Jun. 29, 2004

(54) HYBRID ROTARY ACTUATOR

(75) Inventor: David B. Mohler, Tipp City, OH (US)

(73) Assignee: SAIA-Burgess Inc., Vandalia, OH (US)

(*) Notice: Subject to any disclaimer, the term of this patent is extended or adjusted under 35 U.S.C. 154(b) by 71 days.

(21) Appl. No.: 09/950,007

(22) Filed: Sep. 12, 2001

(65) Prior Publication Data

US 2002/0030572 A1 Mar. 14, 2002

Related U.S. Application Data

(63) Continuation-in-part of application No. 09/660,142, filed on Sep. 13, 2000.

(51) Int. Cl.[7] .............................. H01F 7/08; H01F 7/14
(52) U.S. Cl. ........................................ 335/272; 310/36
(58) Field of Search ............................ 335/272; 310/36

(56) References Cited

U.S. PATENT DOCUMENTS

| | | | |
|---|---|---|---|
| 1,161,819 A | * | 11/1915 | Grob .......................... 335/286 |
| 2,987,657 A | * | 6/1961 | Buchtenkirch et al. ..... 335/272 |
| 3,435,394 A | | 3/1969 | Egger |
| 4,812,884 A | | 3/1989 | Mohler |
| 4,855,700 A | | 8/1989 | Mohler |
| 5,161,083 A | | 11/1992 | Mohler et al. |
| 5,337,030 A | | 8/1994 | Mohler |
| 5,561,375 A | * | 10/1996 | Porcher .................. 324/207.16 |
| 6,078,236 A | | 6/2000 | Mohler et al. ............... 335/272 |

* cited by examiner

*Primary Examiner*—Ramon M. Barrera
(74) *Attorney, Agent, or Firm*—Nixon & Vanderhye P.C.

(57) ABSTRACT

A rotary actuator (16) includes a rotor (48) which is disposed in a housing (34) between first and second pole pieces (42 and 44) of a stator (40). The rotor (48) is rotatable relative to the stator (40) between an unactuated position (FIG. 4) and an actuated position (FIG. 5). During rotation of the rotor (48), the axial extent of a first working air gap (66) between the rotor and a first pole piece (44) of the stator (40) remains constant. However, the axial extent of the working air gap (64) between the rotor (48) and the second pole piece (42) of the stator (40) decreases as the rotor moves from the unactuated position to the actuated position. In a preferred embodiment, the rotor lobes are made so that the net axial force of all of the rotor lobes is substantially zero thereby reducing stress on the rotor shaft support bearings.

23 Claims, 4 Drawing Sheets

FERROUS HOUSING

COIL

FLAT STATOR & ROTOR POLES (TYP.)

ANGLED OR HELICAL STATOR & ROTOR POLES (TYP.)

HYBRID ROTARY ACTUATOR

CROSS-REFERENCES TO RELATED APPLICATIONS

The present invention is a continuation-in-part of "Rotary Actuator" U.S. application Ser. No. 09/660,142 filed Sep. 13, 2000, the entire contents of which is herein incorporated by reference.

BACKGROUND OF THE INVENTION

1. Field of the Invention

The present invention relates to a rotary actuator having a rotor which is rotatable relative to a stator.

2. Discussion of Prior Art

A rotary actuator has been utilized in association with a diverter gate in the sorting of mail or other items traveling by a conveyor. The rotary actuator is effective to rotate the diverter gate from one position to another position within a matter of a few milliseconds, typically within about 0.020 seconds, so as to permit a rapid sorting process. The angle of rotation of the diverter gate is typically about 15° to 20° to move the item of mail from one conveyor path to another conveyor path.

The angle of rotation through which the diverter gate is moved is limited by rubber stop bumpers. The rubber stop bumpers are mounted external to the rotary actuator so as to allow precise adjustment and to minimize impact noise by the diverter gate. At the end of its operating stroke, the diverter gate may tend to rebound as it impacts against one of the rubber bumpers.

If the diverter gate can rebound back into the previous conveyor flow path, a missortment or jam may occur. To prevent a missortment or jam from occurring, the flow rate of mail or other items must be decreased to give time for the diverter gate to return to its fully actuated position. Alternatively, the rate of operation of the rotary actuator must be decreased to reduce the kinetic energy of the rotary actuator and diverter gate at an end of stroke position. Of course, both of these solutions to the problem of diverter gate rebound are counter to rapid sorting requirements.

The rotary actuator for the diverter gate must provide for both rapid movement of the diverter gate from an unactuated position to an actuated position and holding of the diverter gate at its actuated position upon impact of the diverter gate against a rubber bumper. In order to provide both functions adequately, the starting torque of the rotary actuator must be high to provide a high diverter gate acceleration rate. The ending torque of the rotary actuator must be high to counteract the rebound energy imparted by the rubber bumper to the diverter gate.

Known rotary actuators have previously utilized either one of two basic design approaches. The first basic design approach utilizes a pole configuration termed as "constant air gap" for the rotor and stator pole pieces. The second basic design approach utilizes a pole configuration termed as "diminishing air gap" for the rotor and stator pole pieces. The air gaps are the working air gaps across which magnetic flux is conducted between the rotor and stator pole pieces.

The "constant air gap" rotary actuator design is characterized by a high starting torque that decreases to a lower torque as the rotary actuator operates through its operating stroke (it being assumed that a constant current is applied to the coil of the rotary actuator). The high starting torque occurs when lobes of the rotor are only partially overlapping, or aligned with, corresponding stator lobes. Typically, there is a 3° overlap of the rotor lobes and stator lobes at the initial starting position of the rotor.

The maximum torque for the "constant air gap" rotary actuator design occurs between the initial position and an overlap position of about 10°. The torque then steadily drops off for the remainder of the stroke. For a rapid response, a high starting torque is essential to overcome inertia of components of the rotary actuator and diverter gate. However, a rotary actuator of the "constant air gap" design has a relatively low torque at the end of its operating stroke. This relatively low torque is insufficient to prevent rebound of a diverter gate upon impacting of the diverter gate against a rubber bumper.

The "diminishing air gap" rotary actuator design is characterized by a relatively low starting torque due to large initial air gaps between the rotor and stator pole pieces at the beginning of the operating stroke of the rotary actuator. As the rotor rotates, the air gaps decrease and the torque steadily rises toward a high ending torque. Therefore, for a given power level and loading conditions, the rotary actuators having a "constant air gap" design will produce a higher starting torque than the rotary actuators having a "diminishing air gap" design. However, the "diminishing air gap" rotary actuator design will have a higher end of stroke torque. Although the "diminishing air gap" rotary actuator design has the potential to have a relatively high ending torque, small variations in the final position of the diminishing air gaps, being in a series magnetic circuit arrangement, can result in a large variation in the end of stroke torque of the "diminishing air gap" rotary actuator design.

In the foregoing discussion of the background of the present invention, the rotary actuators have been considered in association with a diverter for mail or other items that are traveling along a conveyor. It should be understood that rotary actuators have and, in all probability, will be used in many different environments. For example, rotary actuators have previously been utilized to actuate valves which control fluid flow.

SUMMARY OF THE INVENTION

The present invention provides a new and improved rotary: actuator having a larger beginning of operating stroke torque than is achieved with a corresponding "diminishing air gap" rotary actuator design and a larger ending of operating stroke torque than is achieved with a corresponding "constant air gap" rotary actuator design. This is accomplished by utilizing features of both the "constant air gap" rotary actuator design and the "diminishing air gap" rotary actuator design. Although it is preferred to utilize the improved rotary actuator of the present invention in association with a diverter for mail or other items, it is contemplated that the improved rotary actuator may be utilized in many different environments in association with many different types of devices.

A rotary actuator constructed in accordance with the present invention includes a rotor which is disposed between pole pieces of a stator. The rotor is rotatable relative to the stator between an unactuated position and an actuated position.

A first stator surface on a first pole piece of the stator faces toward and is spaced from a first rotor surface on the rotor by a first working air gap. The first stator surface and the first rotor surface are spaced apart by the same distance when the rotor is in the unactuated position as when the rotor is in the actuated position. Therefore, the axial extent of the working air gap between the first stator surface and the first rotor surface remains constant during rotation of the rotor between the unactuated and actuated positions.

A second stator surface on a second pole piece of the stator faces toward and is spaced from a second rotor surface on the rotor by a second working air gap. The second stator surface and the second rotor surface are spaced apart by a smaller distance when the rotor is in the actuated position than when the rotor is in the unactuated position. Therefore, the axial extent of the second working air gap decreases during rotation of the rotor between the unactuated and actuated positions.

In a further embodiment of the present invention, the configuration of the stator lobes are such that they do not generate any substantial axial force on the rotor shaft. Thus, in one force-balanced embodiment, on a first lobe, the upper surface has a variable spacing configuration and the lower surface has a fixed spacing configuration, and a rotationally adjacent lobe has the lower surface with a variable spacing configuration and the upper surface with a fixed spacing configuration, with the lobe configurations alternating around the rotor. In a preferred force balanced embodiment, each lobe is symmetrical about its plane of rotation between the actuated and unactuated positions although lobe configuration may differ between different lobes. At least one lobe has a variable spacing configuration on its upper and lower surfaces and at least one lobe has a constant spacing configuration on its upper and lower surfaces.

BRIEF DESCRIPTION OF THE DRAWINGS

The foregoing and other features of the present invention will become apparent to one skilled in the art to which the present invention relates upon consideration of the following description of the invention with reference to the accompanying drawings wherein.

DETAILED DESCRIPTION OF THE INVENTION

Diverter Assembly

Figure 1:
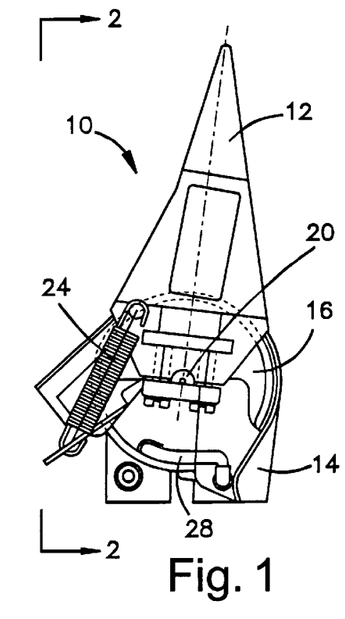
FIG. 1 is a simplified side elevational view illustrating a rotary actuator constructed in accordance with the present invention in association with a diverter gate.
Figure 2:
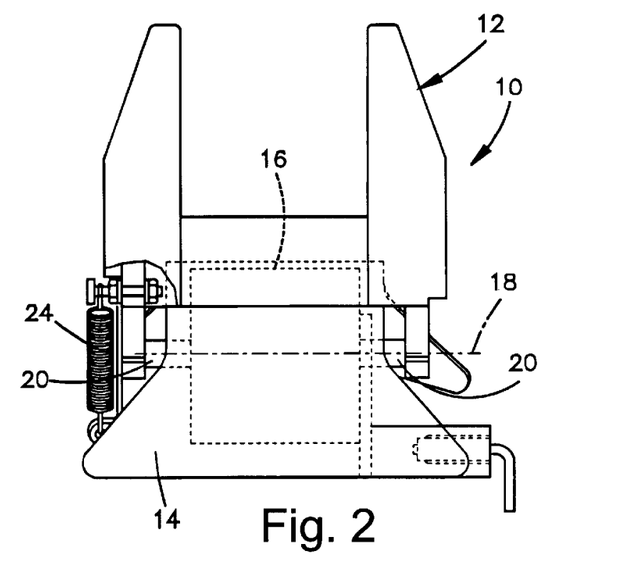
FIG. 2 is a plan view, taken generally along the line 2—2 of FIG. 1, further illustrating the relationship of the rotary actuator to the diverter gate.

A diverter assembly 10 is illustrated in FIGS. 1 and 2. The diverter assembly 10 is adapted to be utilized in conjunction with a conveyor which moves articles, such as mail. The diverter assembly 10 includes a gate 12 which is rotatable relative to a base by an improved rotary actuator 16 constructed in accordance with the present invention.

The rotary actuator 16 is operable to pivot the gate 12 in a clockwise direction, as viewed in FIG. 1, about a central axis 18 (FIG. 2) of the rotary actuator. The rotary actuator 16 has an output shaft 20 which extends in opposite directions from the rotary actuator 16 and is fixedly connected with the gate 12. A helical coil biasing spring 24 is effective to urge the gate 12 and the rotary actuator output shaft 20 to an unactuated position when the rotary actuator 16 is in a de-energized condition. Electrical energy is conducted to the rotary actuator 16 through electrical conductor 28 (FIGS. 1 and 2).

When the rotary actuator 16 is in a de-energized condition, the biasing spring 24 is effective to firmly press the gate 12 against a rubber stop bumper (not shown). By adjusting the position of the rubber stop bumper, the unactuated position of the gate 12 can be accurately adjusted relative to a conveyor conducting mail or other articles at a high speed.

When the diverter assembly 10 is to be operated to divert one or more articles, such as mail, from one conveyor path to another conveyor path, the rotary actuator 16 is operated from the unactuated condition to the actuated condition under the influence of electrical energy conducted through the conductor 28. As this occurs, the gate 12 pivots through approximately twenty degrees in a clockwise direction (as viewed in FIG. 1) about the axis 18 (FIG. 2). The biasing spring 24 is resiliently extended as the gate 12 is pivoted by the rotary actuator.

When the gate 12 is moved to its operated or divert position, the gate engages a second rubber bumper to limit movement of the gate 12 relative to the base 14. As long as the rotary actuator 16 remains energized, the output shaft 20 of the rotary actuator 16 remains stationary and the gate 12 remains in its divert position against the second rubber stop.

When the rotary actuator 16 is de-energized, the biasing spring 24 immediately pulls the rotary gate from its divert position back to the initial position illustrated in FIG. 1. As this occurs, the gate 24 moves out of engagement with the second rubber bumper and moves into engagement with the first rubber bumper. The biasing spring 24 is effective to hold the gate 12 in engagement with the first rubber bumper as long as the rotary actuator 16 is in a de-energized condition. Although the illustrated biasing spring 24 is a helical coil biasing spring, a different type of biasing spring could be utilized if desired. For example, a spiral spring could be utilized. Alternatively, a leaf spring could be utilized.

Mail or other articles being conducted by the conveyor are moving at a relatively high speed. Therefore, the gate 12 must be quickly pivoted from its initial position to its divert position by operation of the rotary actuator 16. When the gate 12 reaches its divert position, the torque transmitted from the rotary actuator 16 to the gate 12 must be sufficient to prevent rebound of the gate 12 from the rubber bumper back toward its initial position.

The torque output of the rotary actuator 16 to the gate 12 must be relatively high when the rotary actuator is initially energized. This relatively high initial torque is required in order to overcome the inertia of components of the rotary actuator 16 and the gate 12. The gate 12 must be moved quickly to its actuated or divert position in order to properly sort the mail and to prevent jamming of the flow of mail.

When the gate 12 reaches its actuated or divert position, the torque output from the rotary actuator 16 must be sufficient to prevent rebounding of the gate 12. To do this, the end of operating stroke output torque from the rotary actuator 16 must be sufficient to offset the kinetic energy absorbed and stored as potential energy by the rubber bumper. Thus, the rotary actuator 16 must have both a relatively high initial output torque and a relatively high end of stroke output torque in order to effect the desired movement of the gate 12.

In the foregoing description, the rotary actuator 16 has been described as being utilized in association with a gate 12 which rotates through approximately twenty degrees to divert articles being moved by a conveyor. It is contemplated that the rotary actuator 16 will be utilized in many different environments in association with many different devices other than diverter assemblies. It is contemplated that the rotary actuator 16 may be operated through an operating stroke which is either greater than or less than twenty degrees.

In the illustrated embodiments of the invention, it is preferred to utilize the biasing spring 24 to move the gate 12 from its divert position back to its initial position. However, the gate 12 could be moved back to its initial position in other ways if desired. For example, a second rotary actuator could be connected with the gate 12.

Hybrid Rotary Actuator—First Embodiment

The rotary actuator 16 (FIG. 3) includes a cylindrical housing 34 which is formed of a magnetically conductive material. A cylindrical coil 36 is disposed within the housing 34. A magnetizable stator 40 is fixedly connected with the housing 34. The stator 40 includes an upper pole piece 42 and a lower pole piece 44. A magnetizable rotor 48 is disposed between the upper and lower pole pieces 42 and 44.

Upon electrical energization of the coil 36, the stator 40 and rotor 48 are both magnetized by magnetic flux emanating from the coil. The magnetic flux from the coil 36 is effective to cause the rotor 48 and output shaft 20 to be rotated in the direction of the arrows 52 relative to the stator 40 and housing 34. As this occurs, the rotor 48 rotates through an operating stroke of approximately twenty degrees relative to the stator 40. Rotation of the rotor 48 causes the output shaft 20 to rotate in a clockwise direction (as viewed in FIG. 3). This rotates the gate 12 (FIG. 1) through approximately twenty degrees, from its initial position to its divert position.

Figure 3:
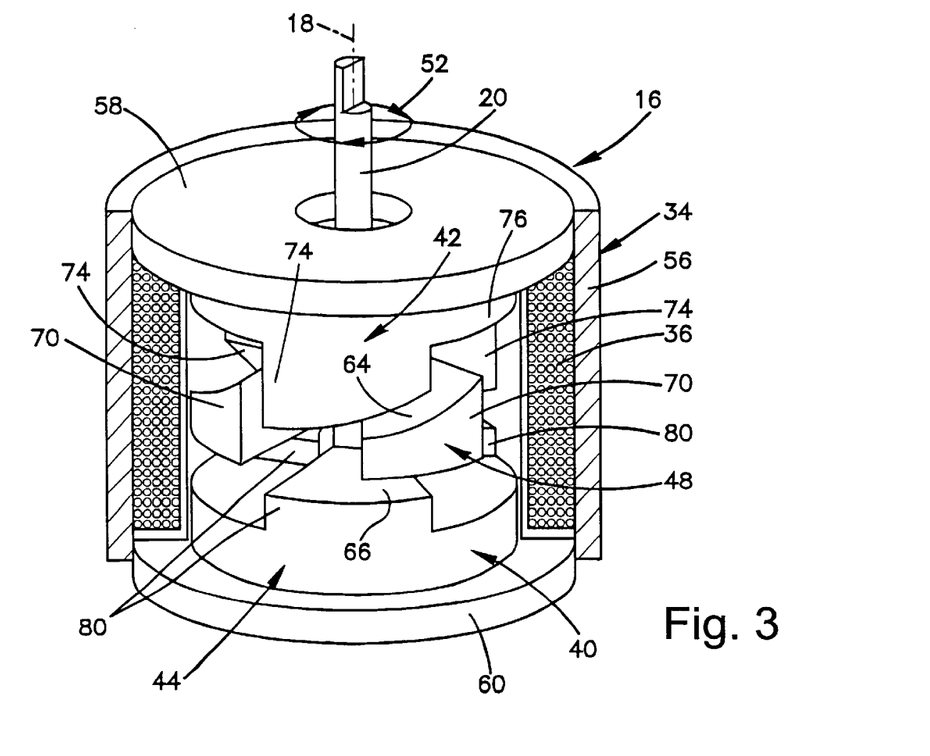
FIG. 3 is a broken away simplified schematic illustration depicting the relationship of a rotor to a stator in the rotary actuator of FIGS. 1 and 2.

In the specific embodiment of the rotary actuator 16 illustrated in FIG. 3, the rotor 48 rotates through an operating stroke of approximately twenty degrees. It should be understood that the rotary actuator 16 may be constructed so as to have the rotor 48 rotate through an operating stroke which is either greater than or less than twenty degrees. The configurations of the stator 40 and rotor 48 could be reversed from the illustrated configurations to reverse the direction of actuation of the rotary actuator 16.

The housing 34 is formed of a magnetizable material, such as iron. This enables the housing to conduct magnetic flux emanating from the coil 36. The housing 34 includes a cylindrical side wall 56 (FIG. 3). Circular upper and lower end plates 58 and 60 are fixedly connected with the side wall 56.

The side wall 56 and end plates 58 and 60 are formed of a magnetic flux conducting material, such as iron. The coil 36 is disposed within the housing 34 and has a cylindrical configuration. The cylindrical coil 36 is disposed in engagement with the side wall 56 and the end walls 58 and 60 of the housing. The cylindrical coil 36 has a central axis which is coincident with the central axis 18 of the output shaft 20. The coil 36 extends around and encloses the stator 40 and the rotor 48.

Upon energization of the coil 36, the coil generates an elongated toroidal electromagnetic flux field which extends upward through the side wall 56 to the upper end plate 58 of the housing 34. The magnetic flux flows downward from the upper end plate 58 of the housing to the upper pole piece 42. The magnetic flux then flows through an upper working air gap 64 to the rotor 48. The magnetic flux then flows from the rotor 48 through a lower working air gap 66 to the lower pole piece 44. The magnetic flux flows from the lower pole piece 44 through the lower end plate 60 to the side wall 56 of the housing 34 to complete the circuitous flux flow path.

The magnetic flux from the coil 36 magnetizes the upper pole piece 42. A south pole of the upper pole piece 42 is adjacent to the upper end plate 58 of the housing 34 and a north pole of the upper pole piece is adjacent to the upper working air gap 64. The magnetic flux from the coil 36 magnetizes the rotor 48. A south pole of the rotor 48 is adjacent to the upper working air gap 64 and a north pole of the rotor is adjacent to the lower working air gap 66. The magnetic flux from the coil 36 magnetizes the lower pole piece 44. A south pole of the lower pole piece 44 is adjacent to the lower working air gap 66 and a north pole of the lower pole piece 44 is adjacent to the lower end plate 60. Of course, the foregoing polarities would be reversed if the direction of flow of current through the coil was reversed.

The output shaft 20 and rotor 48 are held against movement along the central axis 18 of the output shaft. However, the rotor 48 and output shaft 20 are freely rotatable about the axis 18. The rotor 48 is held against axial movement by means of retaining rings that bear against the inner races of shaft bearings.

The retaining rings maintain a preset clearance for the air gaps described previously. Alternative methods for axial retainment include interference fitting of the shaft to the bearings, bonding the shaft to the inner race of the bearings, or other additional components internal to the actuator. However, the rotor 48 is rotatable under the influence of the magnetic flux conducted across the upper and lower working air gaps 64 and 66.

The output shaft 20 and rotor 48 are rotated together in the direction of the arrows 52 in FIG. 3 under the influence of the magnetic flux conducted across the upper and lower working air gaps 64 and 66 between the rotor and stator pole pieces 42 and 44. The rotor 48 and stator pole pieces 42 and 44 are formed of magnetizable material, such as iron. The output shaft 20 is formed of a nonmagnetic material, such as aluminum or 300 series stainless steel, to minimize magnetic flux losses.

In the illustrated embodiment of the invention, the rotor 48 is formed with three identical lobes or arms 70 which are fixedly connected with and extend radially outward from the output shaft 20. Each of the lobes 70 of the rotor 48 has a south pole adjacent to the upper (as viewed in FIG. 3) working air gap 64 and a north pole adjacent to the lower working air gap 66 when the coil 36 is energized. Of course, the polarities of the lobes 70 of the rotor 48 would be reversed if the direction of flow of the current through the coil 36 was reverse.

The lobes or arms 70 of the rotor 48 are integrally formed as one piece. The lobes or arms 70 are equally spaced from each other in a circular array about the output shaft 20. The lobes 70 of the rotor 48 are interconnected by a hub which is integrally formed as one piece with the lobes and is fixedly connected to the output shaft 20.

The upper pole piece 42 is integrally formed as one piece and includes three identical lobes or sections 74 which extend axially downward (as viewed in FIG. 3) from the upper end plate 58 toward the rotor 48. The lobes or sections 74 of the upper pole piece 42 are integrally formed as one piece with a cylindrical base 76 of the upper pole piece. The base 76 of the upper pole piece has a cylindrical opening through which the output shaft 20 extends. The base 76 of the upper pole piece 42 has a central axis which is coincident with the axis 18 of the output shaft 20. The three identical lobes or sections 74 of the upper pole piece 42 are equally spaced apart in a circular array about the axis 18.

The lower pole piece 44 of the stator 40 has three identical lobes or sections 80 which are integrally formed as one piece with a cylindrical base 82 of the lower pole piece 44. The base 82 of the lower pole piece 44 has a cylindrical configuration and is disposed in a coaxial relationship with the output shaft 20. The lower pole piece 44 has a cylindrical central opening through which the output shaft 20 extends. The lobes or sections 80 of the lower pole piece 44 are spaced equal distances apart in a circular array about the central axis 18. The lobes or sections 80 on the lower pole piece 44 are axially aligned with the lobes or sections 74 on the upper pole piece 42.

The rotor 48 and output shaft 20 are held against movement along the axis 18 by suitable bearings (not shown) connected with the end plates 58 and 60 of the housing 34. However, the rotor 48 and output shaft 20 are freely rotatable about the axis 18. Therefore, when the coil 36 is energized and the upper and lower pole pieces 42 and 44 of the stator 40 are magnetized, the rotor 48 can rotate relative to the stator 40. Regardless of the direction in which current is conducted through the coil 36, the resulting magnetic field effects rotation of the rotor 48 in the direction of the arrows 52 in FIG. 3.

The rotor 48 and output shaft are rotated in the direction opposite to the arrows 52 under the influence of the biasing spring 24 (FIGS. 1 and 2) when the coil 36 is de-energized. The biasing spring 24 may be enclosed within the housing 34. Whether the biasing spring 24 is inside or outside of the housing 34, the biasing spring may have a construction other than the illustrated helical construction. In order to minimize cost, it is preferred to utilize just the biasing spring 24 to reverse the rotation of the rotor 48.

Working Air Gaps

Figure 4:
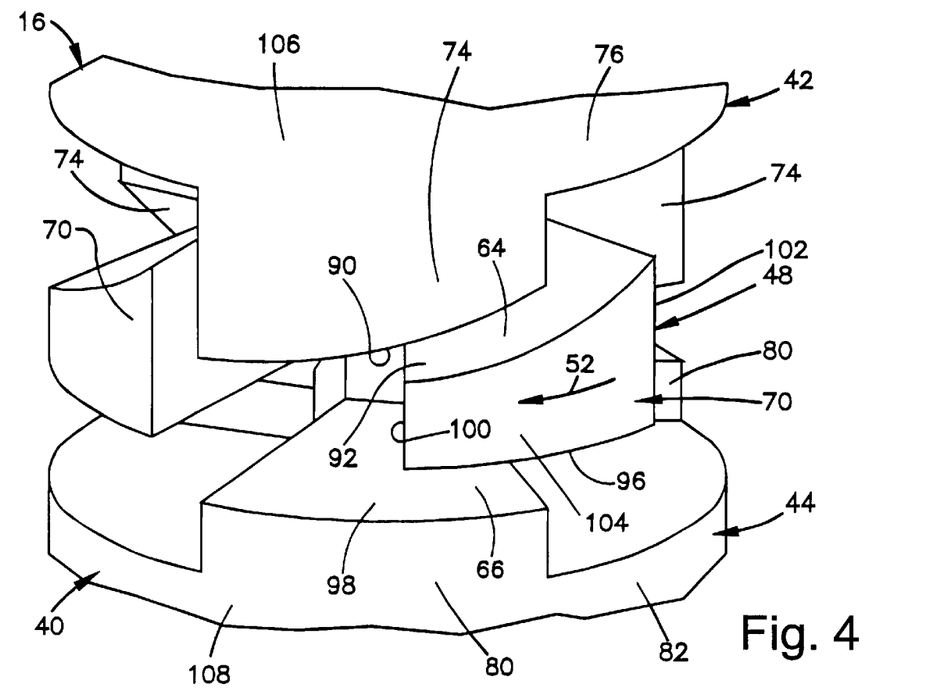
FIG. 4 is an enlarged schematic fragmentary view further illustrating the relationship of the rotor to the stator in the rotary actuator of FIG. 3, the rotor being shown in an unactuated or starting position.
Figure 5:
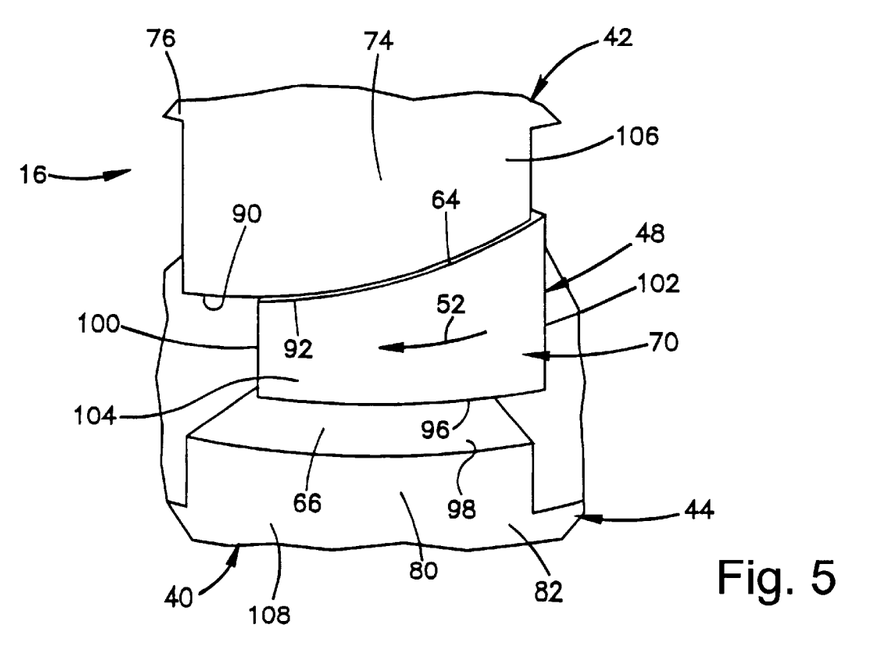
FIG. 5 is a schematic fragmentary view, generally similar to FIG. 4, illustrating the relationship between the rotor and the stator in an actuated or end of stroke position.

In accordance with one of the features of the present invention, the axial extent of the upper working air gap 64 decreases in size and the axial extent of the lower working air gap 66 remains constant in size during rotation of the rotor 48 in the direction indicated by the arrows 52 in FIG. 5. Thus, when the rotor 48 is in the initial or unactuated position of FIG. 4, the axial extent of the upper working air gap 64 is relatively large. Upon rotation of the rotor 48 to the actuated position of FIG. 5, the axial extent of the upper working air gap 64 is relatively small. During rotation of the rotor 48 from the unactuated position of FIG. 4 to the actuated position of FIG. 5, the axial extent of the lower working air gap 66 remains constant. The combination of the diminishing upper working air gap 64 and constant lower working air gap 66 results in the rotary actuator 16 having a relatively high starting or initial torque, compared to a "diminishing air gap" type of rotary actuator, and a relatively large ending torque, compared to a "constant air gap" type rotary actuator.

The upper working air gap 64 is the space across which magnetic flux is conducted from the upper pole piece 42 to the rotor 48 to effect rotation of the rotor in the direction of the arrow 52 in FIG. 4. Similarly, the lower working air gap 66 is the space across which magnetic flux is conducted between the rotor 48 and lower pole piece 44 to effect rotation of the rotor in the direction of the arrow 52 in FIG. 4.

In order to optimize the operating characteristics of the rotary actuator 16, the axial extent of the upper working air gap 64 diminishes in size as the rotor 48 moves from the unactuated position illustrated in FIG. 4 to the actuated position illustrated in FIG. 5. This results in the rotary actuator 16 having a relatively high end of stroke torque to hold the rotor 48 against rebound when the rotary actuator 16 is operated to its actuated condition. The axial extent of the lower working air gap 66 remains constant as the rotor 48 moves from the unactuated position of FIG. 4 to the actuated position of FIG. 5. This results in the rotary actuator 16 having a relatively large initial torque to overcome inertia of components of the rotary actuator and any devices connected with the rotary actuator. The upper working air gap 64 (FIG. 4) is formed between downwardly facing side surface 90 on the lobe or section 74 of the upper pole piece 42 and an upwardly facing side surface 92 on the lobe or arm 70 of the rotor 48. It should be understood that working air gaps, corresponding to working air gap 64, are formed between each of the lobes or arms 70 on the rotor 48 and each of the lobes or sections 74 on the upper pole piece 42.

The downwardly facing side surface 90 on the lobe or section 74 of the upper pole piece 42 is skewed at an acute angle to a plane extending perpendicular to the coincident central axes of the upper pole piece 42 and rotor 48. Similarly, the upwardly facing side surface 92 on the lobe or arm 70 of the rotor 48 is skewed relative to the plane extending perpendicular to the coincident central axes of the upper pole piece 42 and rotor 48. The downwardly facing stator side surface 90 and upwardly facing rotor side surface 92 extend parallel to each other when the rotor 48 is in the actuated position of FIG. 5.

The upper working air gap 64 diminishes from the relatively large axial extent illustrated in FIG. 4 to the relatively small axial extent illustrated in FIG. 5. Although the upper working air gap 64 diminishes in size, the surfaces 90 and 92 do not engage each other when the rotor 48 is in the actuated position of FIG. 5 due to the external rubber bumpers. Thus, there is a relatively large distance between the upwardly facing side surface 92 on the rotor 48 and the downwardly facing rotor side surface 90, as measured perpendicular to the parallel side surfaces, when the rotor is in the unactuated position of FIG. 4. When the rotor 48 is in the actuated position of FIG. 5, there is a relatively small distance between the rotor side surface 92 and stator side surface 90, as measured perpendicular to the side surfaces. The diminishing size of the upper working air gap 64 as the rotor 48 moves from the unactuated position of FIG. 4 to the actuated position of FIG. 5 increases the magnitude of the magnetic flux force urging the rotor 48 to rotate in the direction of the arrows 52 as the upper working air gap 64 diminishes.

The downwardly facing side surface 90 (FIG. 4) on the lobe or section 74 of the upper pole piece 42 has an arcuate configuration. In the illustrated embodiment of the invention, the surface 90 is formed as a portion of a helix which extends around the central axis 18 (FIG. 3) of the rotary actuator 16. Similarly, the upwardly facing side surface 92 (FIG. 4) on the lobe or arm 70 of the rotor 48 has an arcuate configuration. In the illustrated embodiment of the invention, the surface 92 is formed as a portion of a helix which extends around the central axis 18 (FIG. 3) of the rotary actuator 16. The surfaces 90 and 92 (FIG. 4) have the same configuration and are parallel to each other when the rotor 48 is in the actuated position of FIG. 5.

The downwardly facing side surface 90 on the lobe or section 74 of the upper pole piece 42 and the upwardly facing side surface 92 on the lobe or arm 70 of the rotor 48 may have a configuration which is different than the configuration illustrated in FIG. 4. For example, the surfaces 90 and 92 may be flat parallel surfaces.

The lower working air gap 66 (FIG. 4) is formed between a downwardly facing side surface 96 on the rotor 48 and an upwardly facing side surface 98 on the lobe or section 80 of the lower pole piece 44. The downwardly facing rotor side surface 96 and upwardly facing stator side surface 98 are disposed in parallel planes which extend perpendicular to the central axis 18 of the rotor 48.

When the rotor 48 is in the unactuated position of FIG. 4 and when the rotor 48 is in the actuated position of FIG. 5, the distance between the rotor side surface 96 and the stator side surface 98, as measured perpendicular to the rotor and stator side surfaces, is the same. Therefore, as the rotor 48 moves from the unactuated position to the actuated position, the size of the lower working gap 66 remains constant, as measured in a direction perpendicular to the rotor side surface 96 and stator side surface 98.

When the rotor 48 is in the unactuated position of FIG. 4, the distance between the downwardly facing side surface 90 on the stator lobe or section 74 and the upwardly facing side surface 92 on the rotor 48, as measured perpendicular to these surfaces, is greater than the distance between the downwardly facing side surface 96 on the rotor and the upwardly facing side surface 98 on the stator lobe or section 80. As the rotor 48 moves from the unactuated position of FIG. 4 to the actuated position of FIG. 5, the distance between the stator side surface 90 and rotor side surface 92 across the upper working air gap 64 decreases. However, the distance between the downwardly facing rotor side surface 96 and the upwardly facing stator side surface 98 across the lower working air gap 66 remains constant. This results in the rotary actuator 16 having operating characteristics which are a combination of the operating characteristics of a "constant air gap" design rotary actuator and a "diminishing air gap" design rotary actuator.

The lobe or arm 70 of the rotor 48 has an arcuate outer side surface 104. The arcuate outer side surface 104 is formed as a portion of a cylinder having a central axis coincident with the central axis 18 of the rotary actuator 16. Similarly, the upper and lower pole pieces 42 and 44 of the stator 40 have arcuate outer side surfaces 106 and 108. The stator pole piece side surfaces 106 and 108 are formed as a portion of a cylinder. The diameter of the stator pole piece surfaces 106 and 108 may be slightly greater than the diameter of the rotor side surface 104 to provide clearance between the rotor 48 and the coil 36.

The upwardly facing side surface 92 on the lobe or arm 70 of the rotor 48 slopes upward (as viewed in FIG. 4) toward the upper pole piece 42. This results in the lobe or arm 70 of the rotor 48 having a wedge or ramp-shaped configuration. The lobe or arm 70 of the rotor has a rectangular leading end surface 100 which is smaller than a rectangular trailing end surface 102.

The downwardly facing side surface 96 on the lobe or arm 70 extends perpendicular to the leading and trailing end surfaces 100 and 102. The leading and trailing end surfaces 100 and 102 are skewed relative to each other in a direction toward the central axis of the rotor 48.

Figure 6:
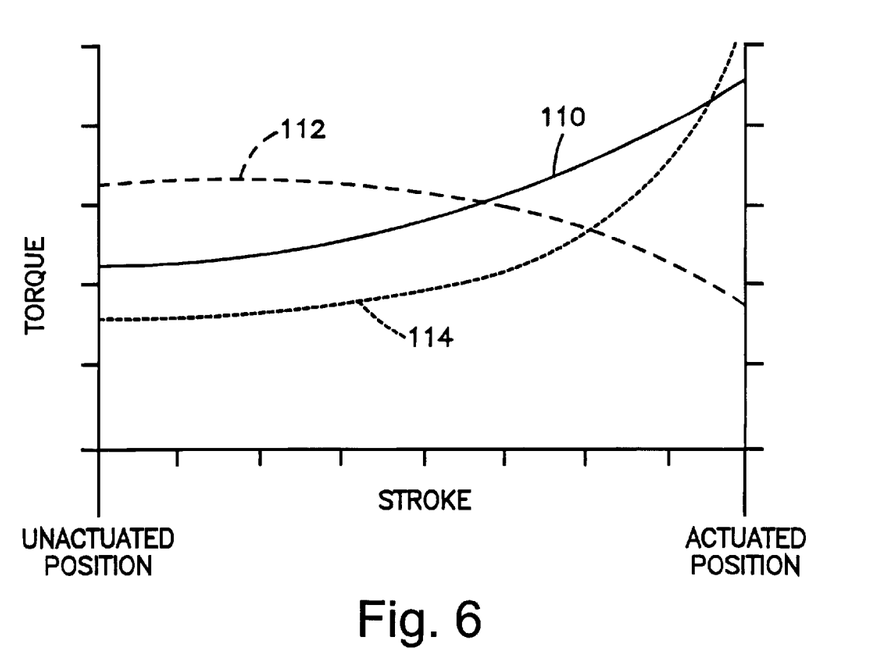
FIG. 6 is an illustrative graph comparing a representation of a typical output torque of the rotary actuator of FIGS. 3–5 and 8 to representations of typical output torques of a "constant air gap," "diminishing air gap," "hybrid air gap" (force un-balanced and balanced) rotary actuators.

The manner in which the output torque of the rotary actuator 16 varies with movement of the rotor 48 through an operating stroke from the unactuated position of FIG. 4 to the actuated position of FIG. 5 is illustrated by a solid line curve 110 in FIG. 6. The manner in which the output torque of a "constant air gap" design rotary actuator varies with an operating stroke of the rotor is indicated by a large dash curve designated 112 in FIG. 6. The manner in which the output torque of a "diminishing air gap" design rotary actuator changes during an operating stroke is indicated by a small dash curve 114 in FIG. 6.

It is desirable to have a relatively large output torque from the rotary actuator 16 at the beginning of its operating stroke and at the end of its operating stroke. From FIG. 6, it is apparent that the initial output torque of the rotary actuator 16, as indicated by the curve 110, is greater than the initial output torque of the "diminishing air gap" type rotary actuator, as indicated by the curve 114. However, the initial torque of the rotary actuator 16 is less than the initial torque of the "constant air gap" type rotary actuator, as indicated by the curve 112 in FIG. 6. This will result in the rotary actuator 16 being better able to overcome the inertia of components of the rotary actuator and devices connected with the rotary actuator 16 at the beginning of an operating stroke than with the "diminishing air gap" type rotary actuator.

The torque of the rotary actuator 16 at the end of its operating stroke, indicated by the curve 110 in FIG. 6, is substantially greater than the end of operating stroke torque of the "constant air gap" rotary actuator having the characteristics indicated by the curve 112 in FIG. 6. The rotary actuator 16 may also have an end of operating stroke torque which is less than the end of stroke torque of the "diminishing air gap" rotary actuator. However, the end of operating stroke torque of the "diminishing air gap" design may not exceed the end of operating stroke torque of the actuator 16 by as much as is indicated by the curves 1110 and 114 in FIG. 6. This is because the end of stroke position of the rotary actuator 16 can be more accurately adjusted than the end of stroke position of known "diminishing air gap" rotary actuators.

The known "diminishing air gap" rotary actuators have rotors with sloping or ramped-shaped surfaces on both sides of the rotor. This makes adjustment of the end of stroke position more difficult than with the rotary actuator 16. This is because there are two air gaps, corresponding to the air gaps 64 in FIG. 4, which diminish in size as the rotor rotates through its operating stroke. By having one of the air gaps of constant size, that is, the lower working air gap 66, the rotary actuator 16 can be more easily adjusted than a rotary actuator having two diminishing size air gaps.

Figure 7:
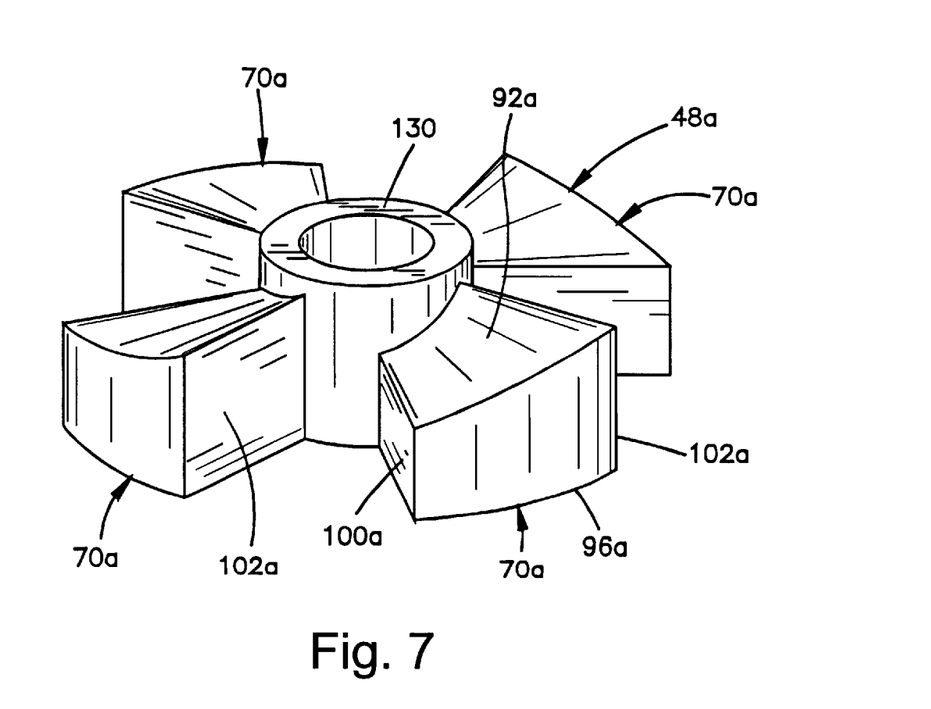
FIG. 7 is a simplified pictorial illustration of a rotor for a second embodiment of the rotary actuator.

In the embodiment of the invention illustrated in FIGS. 1–5, the rotor has three lobes or arms 70 which extend radially outward from the rotor. In the embodiment of the rotor illustrated in FIG. 7, the rotor has four arms or lobes. Since the embodiment of the rotor illustrated in FIG. 7 is generally similar to the embodiment of the rotor illustrated in FIGS. 1–5, similar numerals will be utilized to designate similar components, the suffix letter "a" being associated with the numerals of FIG. 7 to avoid confusion.

The rotor 48a is provided with four lobes or arms 70a. Each of the lobes or arms 70a has the same construction and is connected with a central hub 130. The four lobes or arms 70a and hub 130 are integrally formed as one piece of magnetizable material.

The rotor arm 70a has a leading end surface 100a with a flat rectangular configuration and a trailing end surface 102a with a flat rectangular configuration. In addition, the rotor arm 70a has an upwardly facing side surface 92a with an arcuate configuration. The rotor arm 70a has a flat downwardly facing side surface 96a.

The rotor 48a cooperates with a stator, corresponding to the stator 40 of FIG. 4. However, the stator with which the rotor 48a cooperates has upper and lower pole pieces with four lobes or sections rather than three lobes or sections. Thus, the rotor 48a cooperates with an upper pole piece having four lobes with downwardly facing arcuate side surfaces, corresponding to the downwardly facing side surfaces 90 on the lobes or sections 74 of the upper pole piece 42 of FIG. 4. Similarly, the stator which cooperates with the rotor 48a has a lower pole piece, corresponding to the pole piece 44 of FIG. 4, with four lobes or sections with flat upwardly facing side surfaces, corresponding to the side surface 98 of FIG. 4.

Hybrid Rotary Actuator—Second Embodiment

In addition to changing the number of lobes of the rotor and stator combination, there are further variations on the hybrid rotary actuator that are significant. It will be appreciated that the hybrid rotary actuators shown in FIGS. 3 & 7 have a horizontal pole and rotor surfaces which are closely spaced and therefore provide a low reluctance airgap as compared to the angled or helical pole and rotor surfaces which have a high reluctance airgap, at least at the beginning of the stroke. This variation in reluctance at the airgaps provides a variation in force (not only in amplitude of force but the application direction of the force) which in turn is applied to the shaft of the rotor. To the extent that the axial components of the forces applied to the shaft are not equal, they will generate a net axial component.

The shaft, as noted above, is constrained against any axial movement but free for rotational movement between the actuated and unactuated positions. However, the net force difference would tend to try to move the shaft axially as well, providing an additional load on the actuator bearings and possibly resulting in undue wear on the actuator bearings.

Figure 8:
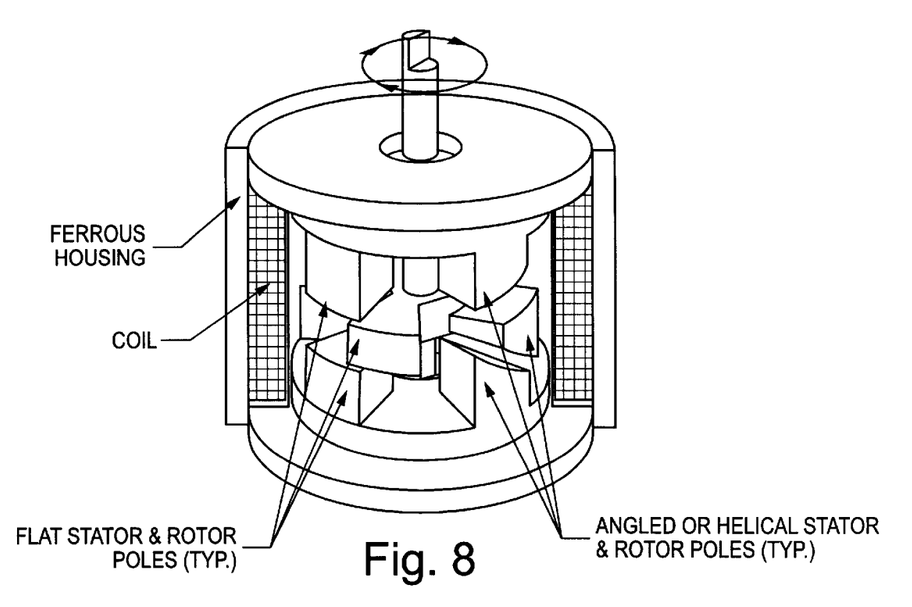
FIG. 8 is a broken away simplified schematic illustration depicting the relationship of a rotor to a stator in a force-balanced embodiment of the present invention.

FIG. 8 illustrates a force-balanced hybrid rotary actuator which does not present force differences on the rotor shaft. Each of the lobes of the rotor generates a symmetrical rotational force (while the rotational force components add, the axial components cancel each other) having little or no axial component. As a result of all rotor lobes being essentially force balanced, there is primarily only a rotational force applied to the shaft which eliminates or at least substantially reduces axial load wear on the actuator shaft bearings.

Figure 9A:
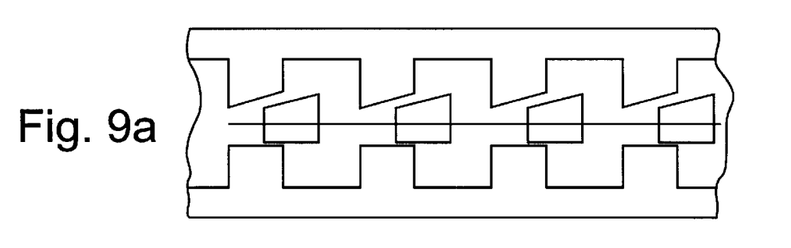
FIGS. 9a to 9c are comparison side views of the stator/rotor interrelationship in force-unbalanced (FIG. 9a) and force-balanced (FIGS. 9b & 9c) versions of the present invention.
Figure 9B:
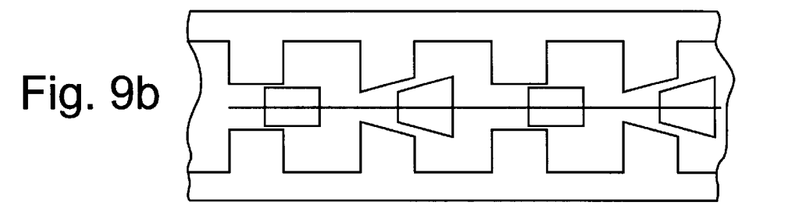
Figure 9C:
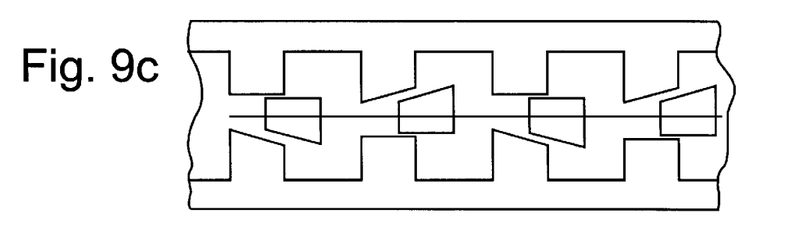

FIGS. 9a through 9c compare the rotor/stator configuration of non-force balanced hybrid rotary actuator of FIGS. 3 and 7 (shown in FIG. 9a) to force-balanced hybrid rotary actuators (FIG. 9b corresponds to the rotor/stator configuration of FIG. 8 and FIG. 9c is a further embodiment). If the force-balanced hybrid shown in FIGS. 9a through 9c have a similar number of angled or helical pole surfaces, they will have similar torque/stroke curves (regardless of whether they are force balanced or unbalanced. It can be seen that all three embodiments have the same number of angled or helical surfaces and the same number of flat surfaces. Thus the curve 110 for a hybrid would be applicable for either the force balanced (FIGS. 9b & 9c) or force unbalanced (FIG. 9a) hybrids.

As will be apparent, to obtain the benefit of the force-balanced rotor concept, one must only insure that, after the force components for all of the rotor lobes are summed, the net resultant force in the axial direction is as low as possible. The desired zero net axial force component is achieved in the FIG. 8 embodiment by having rotor lobes (and adjacent stator pole pieces) which alternate between those having surfaces parallel to the direction of rotation and those having surfaces inclined to the direction of rotation.

However, if the desired stroke/torque characteristics of the force balanced hybrid are desired to be closer to those of the "constant airgap" rotary actuator (as shown in FIG. 6, i.e., with higher starting torque with lower ending torque), more parallel surface lobes and less inclined surface lobes could be employed. Similarly, more inclined surface lobes and less parallel surface lobes could be used if a lower starting torque and higher ending torque similar to the "diminished airgap" rotary actuator were desired.

In order to substantially balance the axial forces, as long as the same number of inclined surfaces are used on the top and bottom of the rotor, the axial force components will effectively cancel each other resulting in a force-balanced rotor. It will be seen that each of the configurations shown in FIGS. 9b and 9c meet this requirement. Additionally, combinations of the stator and rotor components shown in FIGS. 9b and 9c could be combined to provide force balanced rotors with different starting and ending torque effects.

Conclusion

In view of the foregoing description, it is clear that a: rotary actuator constructed in accordance with the present invention has a larger beginning of operating stroke torque than is achieved with a corresponding "diminishing air gap" rotary actuator design and a larger ending of operating stroke torque than is achieved with a corresponding "constant air gap" rotary actuator design. This is accomplished by utilizing features of both the "constant air gap" rotary actuator design and the "diminishing air gap" rotary actuator design. Although it is preferred to utilize the improved rotary actuator 16 of the present invention in association with a diverter 12 for mail or other items, it is contemplated that the improved rotary actuator may be utilized in many different environments in association with many different types of devices.

A rotary actuator 16 constructed in accordance with the present invention includes a rotor 48 which is disposed between pole pieces 42 and 44 of a stator 40. The rotor 48 is rotatable relative to the stator 40 between an unactuated position (FIG. 4) and an actuated position (FIG. 5).

A first stator surface 98 on a first pole piece 44 of the stator 40 faces toward and is spaced from a first rotor surface 96 on the rotor 48 by a first working air gap 66. The first stator surface 98 and the first rotor surface 96 are spaced apart by the same distance when the rotor is in the unactuated position (FIG. 4) as when the rotor is in the actuated position (FIG. 5). Therefore, the axial extent of the working air gap 66 between the first stator surface 98 and the first rotor surface 96 remains constant during rotation of the rotor 48 between the unactuated and actuated positions.

A second stator surface 90 on a second pole piece 42 of the stator 40 faces toward and is spaced from a second rotor surface 92 on the rotor 48 by a second working air gap 64. The second stator surface 90 and the second rotor surface 92 are spaced apart by a smaller distance when the rotor 48 is in the actuated position (FIG. 5) than when the rotor is in the unactuated position (FIG. 4). Therefore, the axial extent of the second working air gap 64 decreases during rotation of the rotor 48 between the unactuated and actuated positions.

In order to reduce wear on the actuator rotor mounting bearings, various rotor designs (symmetric or asymmetric) resulting in reduced or eliminated axial force components could be used, such as the force balanced rotors described above.

In view of the above description of the invention, those having ordinary skill in the art will appreciate that many improvements, changes and modifications to the hybrid rotary actuator are possible. Such improvements, changes and modifications within the skill of the art are intended to be covered by the appended claims and thus, the present invention is limited only by the appended claims.

I claim:

1. A hybrid rotary actuator comprising:

a housing;

a stator having first and second pole pieces disposed in said housing;

a rotor disposed in said housing between said first and second pole pieces of said stator, said rotor being rotatable relative to said stator between an unactuated position and an actuated position;

said first pole piece of said stator having a first stator surface which faces toward and is spaced from a first rotor surface on said rotor by a first working air gap, said first stator surface on said first pole piece of said stator and said first rotor surface on said rotor being spaced apart by the same distance when said rotor is in the unactuated position as when said rotor is in the actuated position so that the extent of the first working air gap along the axis of rotation of the rotor remains constant during rotation of said rotor between the unactuated and actuated positions;

said second pole piece of said stator having a second stator surface which faces toward and is spaced from a second rotor surface on said rotor by a second working air gap, said second stator surface on said second pole piece of said stator and said second rotor surface on said rotor being spaced apart by a smaller distance when said rotor is in the actuated position than when said rotor is in the unactuated position so that the extent of the second working air gap along the axis of rotation of the rotor decreases during rotation of said rotor between the unactuated and the actuated positions; and a coil which is disposed in said housing and extends around at least a portion of said stator, said coil being energizable to provide magnetic flux which passes across the space between said first stator surface and said first rotor surface and which passes across the space between said second stator surface and said second rotor surface during at least a portion of the rotation of said rotor between the unactuated position and the actuated position, said flux biasing said rotor to move from said unactuated position towards said actuated position.

2. An apparatus as set forth in claim 1 wherein said first stator surface and said first rotor surface are disposed in parallel planes which extend perpendicular to an axis about which said rotor is rotatable between the unactuated position and the actuated position, said second stator surface and said second rotor surface are inclined with respect to the parallel planes in which said first stator surface and said first rotor surface are disposed.

3. An apparatus as set forth in claim 1 wherein said first stator surface and said first rotor surface have flat configurations, said second stator surface and said second rotor surface have flat configurations and are inclined with respect to said first stator surface and said first rotor surface.

4. An apparatus as set forth in claim 1 further including a diverter gate connected with said rotor, said diverter gate being movable with said rotor during movement of said rotor between the unactuated and actuated positions.

5. An apparatus as set forth in claim 4 further including a spring connected with said diverter gate, said spring being effective to apply a force to said diverter gate to effect movement of said rotor from the actuated position to the unactuated position.

6. A method comprising the steps of:

rotating a rotor relative to first and second stator pole pieces under the influence of a magnetic field conducted across a first working air gap between a first surface on the rotor and a surface on the fist stator pole piece and across a second working air gap between a second surface on the rotor and a surface on the second stator pole piece;

maintaining the extent of the first working air gap along the axis of rotation of the rotor constant during rotation of the rotor; and varying the second working air gap during rotation of the rotor.

7. A hybrid rotary actuator, said actuator comprising:

a stator having at least first and second pole pieces;

at least one rotor disposed between said at least first and second pole pieces of said stator, said at least one rotor being rotatable relative to said stator between an unactuated position and an actuated position, said at least one rotor having at least two rotor lobes generally disposed between corresponding stator lobes on each of said at least first and second stator pole pieces, each rotor lobe having upper and lower surfaces spaced apart from corresponding surfaces on said corresponding stator lobes of said at least first and second pole pieces of said stator;

said respective rotor lobe and stator lobe surfaces defining one of two possible configurations, each of said configurations comprising one of a fixed and variable rotor/stator surface spacing during rotation of said rotor; and a coil which extends around at least a portion of said stator, said coil being energizable to provide magnetic flux which passes between said first and second stator pole piece and through said rotor during at least a portion of the rotation of said rotor between the unactuated position and the actuated position where at least one rotor lobe upper surface has a fixed rotor/stator surface spacing and at least one rotor lobe lower surface has a variable rotor/stator surface spacing.

8. A hybrid rotary actuator according to claim 7, wherein the fixed rotor/stator surface spacing is on only one of the upper and lower surfaces of said at least two rotor lobes.

9. A hybrid rotary actuator according to claim 7, wherein the fixed rotor/stator surface spacing is on both the upper and lower surfaces of at least one of said at least two rotor lobes.

10. A hybrid rotary actuator according to claim 7, wherein the fixed rotor/stator surface spacing is on one of the upper surface of at least one of said at least two rotor lobes and is on one of the lower surface of at least one of said at least two rotor lobes.

11. A hybrid rotary actuator according to claim 10, wherein the fixed rotor/stator surface spacing is on the upper and lower surface of at least one of said at least two rotor lobes.

12. A hybrid rotary actuator according to claim 10, wherein the fixed rotor/stator surface spacing is on the upper surface of at least one of said at least two rotor lobes and is on one of the lower surface of an adjacent one of said at least two rotor lobes.

13. A hybrid rotary actuator according to claim 7, further including a housing, said coil and said at least one rotor disposed within said housing, said housing, said stator and said at least one rotor forming a generally toroidal magnetic circuit around said coil.

14. A hybrid rotary actuator according to claim 13, further including a shaft upon which said rotor is mounted for rotation therewith, wherein said housing includes a cylindrical housing portion and two endcap portions, each of said endcap portions mounting a respective pole piece.

15. A hybrid rotary actuator according to claim 14, wherein the fixed rotor/stator surface spacing is on only one of the upper and lower surfaces of said at least two rotor lobes.

16. A hybrid rotary actuator according to claim 14, wherein the fixed rotor/stator surface spacing is on both the upper and lower surfaces of at least one of said at least two rotor lobes.

17. A hybrid rotary actuator according to claim 14, wherein the fixed rotor/stator surface spacing is on one of the upper surface of at least one of said at least two rotor lobes and is on one of the lower surface of at least one of said at least two rotor lobes.

18. A hybrid rotary actuator according to claim 17, wherein the fixed rotor/stator surface spacing is on the upper and lower surface of at least one of said at least two rotor lobes.

19. A hybrid rotary actuator according to claim 17, wherein the fixed rotor/stator surface spacing is on the upper surface of at least one of said at least two rotor lobes and is on one of the lower surface of an adjacent one of said at least two rotor lobes.

20. A hybrid rotary actuator according to claim 15, wherein said stator comprises three lobes.

21. A hybrid rotary actuator according to claim 16, wherein said stator comprises four lobes and said fixed spacing is on two of said four lobes.

22. A hybrid rotary actuator according to claim 18, wherein said stator comprises four lobes and said fixed spacing is on the upper and lower surfaces of two of said lobes and said inclined spacing is on the upper and lower surfaces of two of said lobes.

23. A hybrid rotary actuator according to claim 19, wherein said stator comprises four lobes and said fixed spacing is on the upper surfaces and said inclined spacing is on the lower surfaces of a first two of said lobes and said inclined spacing is on the upper surfaces and said fixed spacing is on the lower surfaces of a second two of said lobes.

* * * * *